(12) United States Patent
Mori

(10) Patent No.: US 8,417,089 B2
(45) Date of Patent: Apr. 9, 2013

(54) RECORDING APPARATUS

(75) Inventor: Kurumi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 26 days.

(21) Appl. No.: 13/212,451

(22) Filed: Aug. 18, 2011

(65) Prior Publication Data

US 2012/0051715 A1  Mar. 1, 2012

(30) Foreign Application Priority Data

Aug. 24, 2010 (JP) ................. 2010-187429

(51) Int. Cl.
*H04N 5/77* (2006.01)
*H04N 9/80* (2006.01)

(52) U.S. Cl.
USPC ........................ 386/224; 386/248

(58) Field of Classification Search ........... 386/223–227
See application file for complete search history.

(56) References Cited

U.S. PATENT DOCUMENTS

2006/0209191 A1* 9/2006 Tsukui .............. 348/207.99
2008/0154982 A1* 6/2008 Watanabe ............. 707/203

FOREIGN PATENT DOCUMENTS

JP   2007-288557 A   11/2007

* cited by examiner

*Primary Examiner* — Thai Tran
*Assistant Examiner* — Nigar Chowdhury
(74) *Attorney, Agent, or Firm* — Canon USA Inc IP Division

(57) ABSTRACT

The present invention is directed to a recording apparatus and method for setting, when moving images are recorded on a plurality of recording media, whether to independently record additional information on each of the recording media.

7 Claims, 14 Drawing Sheets

FIG. 2A

| SETTING ITEM | SETTING VALUE |
|---|---|
| GAMMA | CINE MODE 1 |
| BLACK MASTER PEDESTAL | 25 |
| LOW KEY SATURATION | ON |
| KNEE | ON |
| SHARPNESS | 10 |

FIG. 2B

| SETTING ITEM | SETTING VALUE |
|---|---|
| LOCATION | AAAA |
| PHOTOGRAPHER | BBBB |
| TITLE | CCCC |
| DATE | 2010/05/20 |
| GPS | ON |

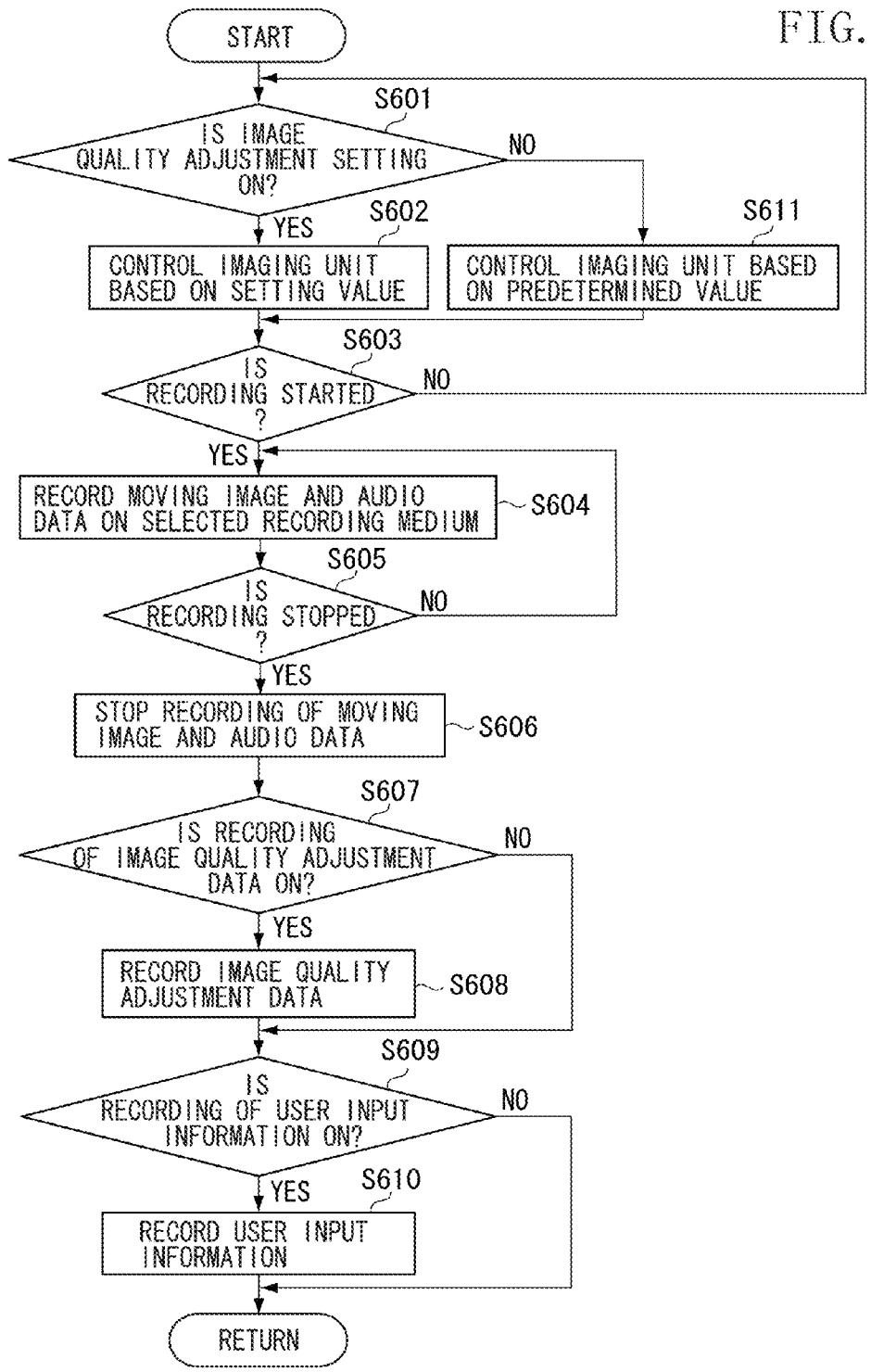

RECORDING APPARATUS

BACKGROUND OF THE INVENTION

1. Field of the Invention

The present invention relates to a recording apparatus and a recording method.

2. Description of the Related Art

There has conventionally been known a recording apparatus that records a moving image signal or an audio signal on a recoding medium. One of such recording apparatuses can record moving image signals on a plurality of recording media. For example, Japanese Patent Application Laid-Open No. 2007-288557 discusses, as a home digital versatile disc (DVD) recorder, a hard disk recorder that includes a large-capacity hard disk (HDD) and a DVD drive.

A video camera has been put to practical use, which has a function of loading a plurality of memory cards and recording moving images or still images on the plurality of memory cards. In broadcasting, higher reliability is required of a recorded moving image signal than home photographing.

A certain business video camera has a function of simultaneously recording the same moving image signal on a plurality of recording media. Recording the same moving image signal on the plurality of recording media enables, even when the moving image data recorded on a certain recording medium cannot be correctly reproduced or when a certain recording medium is lost, reproduction of the same moving image from the other recording medium. In addition, in the business video camera, a user can adjust a camera operation state during photographing, and can desire to record a setting state of the camera after the adjustment as additional information.

As described above, when a video camera is used for business purposes, after simultaneous recording of moving images on a plurality of recording media, one recording medium may be given to an editor for editing while the other recording medium may be kept on hand. In this case, when the additional information is recorded on both recording media, the recording medium with the additional information recorded thereon may be given to the editor.

However, the additional information such as a setting state of the camera is information unique to a camera operator, who may not wish the information divulged to the outside. Thus, when a moving image signal and additional information are simultaneously recorded on a plurality of recording media, the additional information may be required to be deleted from one recording medium that is to be given to the editor. This deletion may require much time and labor.

SUMMARY OF THE INVENTION

The present invention is directed to a recording apparatus and a recording method capable of setting, when moving images are recorded on a plurality of recording media, whether to independently record additional information on each recording medium.

According to an aspect of the present invention, a recording apparatus includes an input unit configured to input moving image data, a recording unit configured to record at least one of a moving image file containing the moving image data input by the input unit and an additional information file containing additional information of the moving image data on at least one of a plurality of recording media, a mode setting unit configured to set one of a plurality of modes including a first recording mode in which the recording unit records the moving image file on a selected one of the plurality of recording media and a second recording mode in which the recording unit simultaneously records the moving image file on each of the plurality of recording media, a setting unit configured to, while in the second recording mode, set whether to record the additional information file on each of the plurality of recording media or on one of the plurality of recording media, and a control unit configured to control, based on a setting result by the setting unit, whether to record the additional information file on each of the plurality of recording media by the recording unit in the second recording mode.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 2A and 2B illustrate examples of image quality adjustment data and user input information.

FIG. 6 is a flowchart illustrating processing in a single recording mode.

DESCRIPTION OF THE EMBODIMENTS

Various exemplary embodiments, features, and aspects of the invention will be described in detail below with reference to the drawings.

Figure 1:
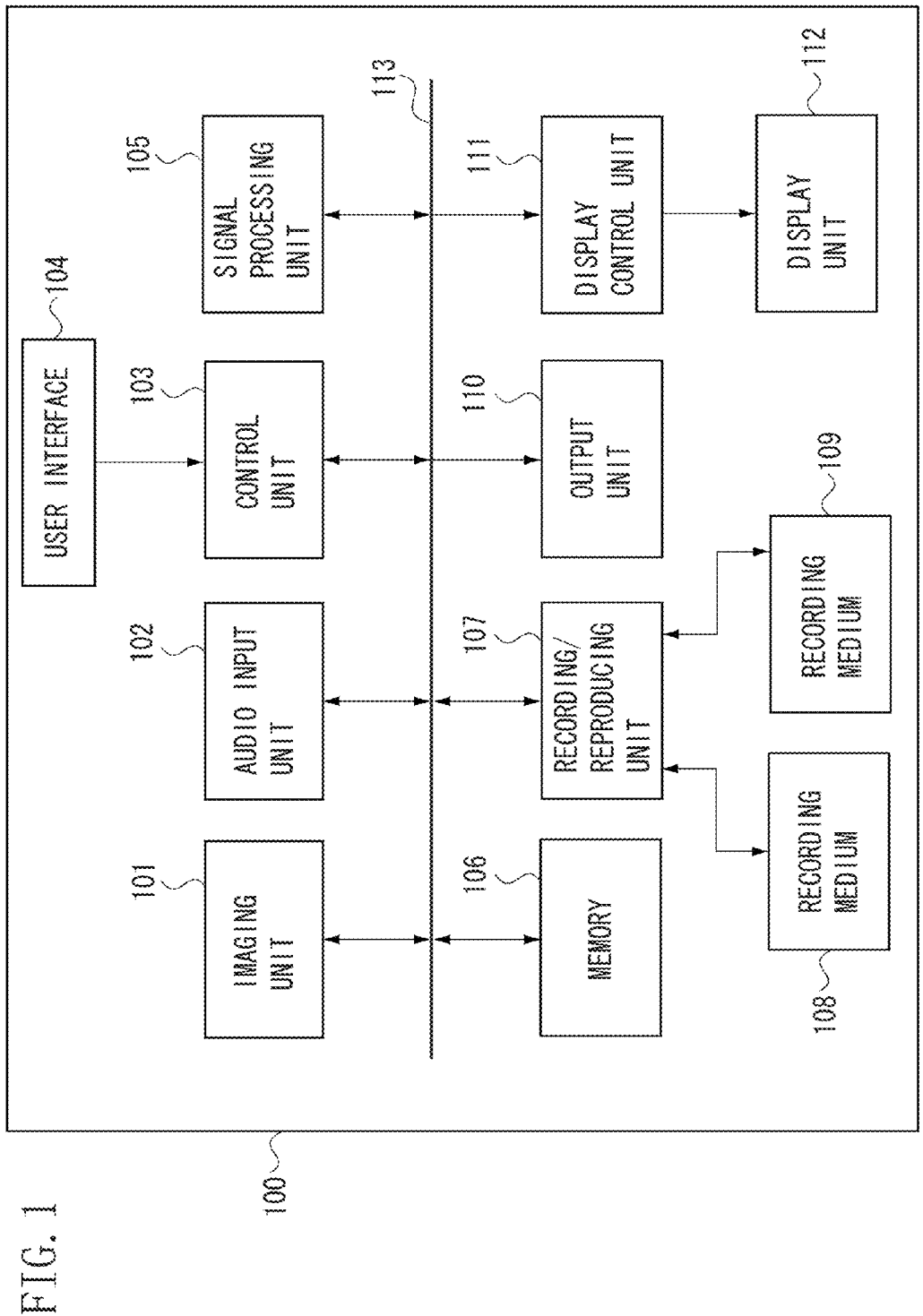
FIG. 1 is a block diagram illustrating a configuration example of a recording apparatus according to a first exemplary embodiment of the present invention.

FIG. 1 is a block diagram illustrating a configuration example of a recording apparatus 100 according to a first exemplary embodiment of the present invention.

In FIG. 1, an imaging unit 101 photographs an object to output moving image data. The imaging unit 101 includes an optical system such as a zoom lens or a focus lens, an image sensor such as a charge-coupled device (CCD) sensor, an iris, an audio/digital (AD) converter that converts a photographed moving image signal into a digital signal, and a processing circuit that performs processing necessary for the photographed moving image. As described below, the imaging unit 101 changes a focusing or zooming operation, a shutter speed, or the iris based on a control signal from a control unit 103. The imaging unit 101 changes parameters of image processing performed for the photographed moving image data based on the control signal from the control unit 103. An audio input unit 102 includes a microphone or an amplifier, and acquires an external sound to output audio data.

The control unit 103 controls an overall operation of the recording apparatus 100 according to an input from a user interface (UI) 104. The control unit 103 includes a microcomputer or a memory, and controls the overall operation of the recording apparatus 100 based on a program stored in the memory (not illustrated). The control unit 103 includes a recording medium interface to communicate data or commands with a recording/reproducing unit 107. The UI 104 includes various switches operable by a user, and an operation unit such as a touch panel included in a display unit 112. The UI 104 receives various instructions from the user to notify the control unit 103 of the instructions. The UI 104 includes a power switch, a switch for instructing a start or an end of recording, and a switch for changing a mode of the recording apparatus 100 between a recording mode and a reproducing mode.

A signal processing unit 105 codes, during recording, the moving image data acquired by the imaging unit 101 or the audio data acquired by the audio input unit 102 according to a coding format such as Moving Picture Coding Group (MPEG) to compress its information amount. During reproduction, the signal processing unit 105 decodes the reproduced moving image data or audio data to decompress its information amount.

A memory 106 stores the moving image data or the audio data. Each block of the recording apparatus 100 accesses the memory 106 to process the necessary moving image data or audio data. The memory 106 stores, in addition to the moving image data or the audio data, various pieces of information such as information or management information of a file system, and functions as a work memory for control performed by the control unit 103. As described below, the memory 106 stores additional information such as image quality adjustment data or user input information generated by the control unit 103.

The recording/reproducing unit 107 records and reproduces various pieces of information such as the moving image data, the audio data, or the additional information on and from a recording medium 108 (first recording medium) and a recording medium 109 (second recording medium). During recording, the recording/reproducing apparatus 107 records a moving image file containing the moving image data or the audio data stored in the memory 106 on the recording medium 108 or the recording medium 109. During reproduction, the recording/reproducing unit 107 reproduces the moving image file from the recording medium 108 or the recording medium 109, and stores the moving image data or the audio data in the memory 106. According to the present exemplary embodiment, the recording media 108 and 109 are separately arranged random-access recording media such as HDDs or flash memory cards. In the present exemplary embodiment, the recording media 108 and 109 are memory cards.

The recording/reproducing unit 107 manages the moving image data, the audio data, or various pieces of information recorded on the recording medium 108 or 109 as a file according to a file system such as a file allocation table (FAT). The recording/reproducing unit 107 includes a well-known interface (IF) such as AT Attachment (ATA), and communicates data or various commands with the recording medium IF in the control unit 103. A loading/discharging mechanism (not shown) enables easy loading or discharging of the recording media 108 and 109 from the recording apparatus 100. However, the recording apparatus 100 can include both or one of the recording media 108 and 109.

When the moving image file is written in or read from the recording medium 108 or 109, the control unit 103 controls the recording/reproducing unit 107 to reproduce file system data (management data) from the recording medium 108 or 109 and store the data in the memory 106. The file system data, which indicates a file name of data recorded on the recording medium 108 or 109, a file size, or a recording address of the data, is management information to manage the file. The control unit 103 controls writing or reading of the file based on the read file system data. The control unit 103 updates the file system data stored in the memory 106 after the file has been written in the recording medium 108 or 109. The recording/reproducing unit 107 then records the updated file system data on the recording medium 108 or 109.

The user can instruct, by operating the UI 104, switching of an operation mode of the recording apparatus 100, or a start or an end of moving image data recording. According to the present exemplary embodiment, when the two recoding media 108 and 109 are loaded, one of the recording media is automatically selected, and the moving image data is recorded on the selected recording medium. When one of the recording media 108 and 109 is loaded, the moving image and the sound are recorded on the loaded recording medium.

According to the present exemplary embodiment, when the two recording media 108 and 109 are loaded, the user can instruct simultaneous (parallel) recording of the input moving image data on the two recording media 108 and 109. Thus, the recording apparatus 100 has a single recording mode (first recording mode) for selecting one recording medium and recording the moving image file on the selected recording medium and a double recording mode (second recording mode) for simultaneously recording the moving image file on the two recording media. The user can optionally set a mode.

An output unit 110 outputs the reproduced moving image data or audio data to an external display apparatus of the recording apparatus 100. A display control unit 111 displays the moving image or various pieces of information on the display unit 112 that includes a display apparatus such as a liquid crystal panel. A data bus 113 is used for transmitting or receiving data or various control commands with the respective units of the recording apparatus 100.

Next, an additional information file recorded by the recording apparatus 100 is described. According to the present exemplary embodiment, in addition to the moving image file, image quality adjustment data indicating a setting state of the imaging unit 101, user input information containing other pieces of predetermined information can be recorded as additional information files independent of the moving image file.

The image quality adjustment data is data on a setting state when the quality of the moving image photographed by the imaging unit 101 is adjusted. The image quality adjustment data can be used for checking the setting state of the imaging unit 101 during photographing of the recorded moving image data at a later date. The image quality adjustment data recorded on the recording medium is read, and then setting of the imaging unit 101 can be changed based on a value of the read image quality adjustment data. The user input information is data on an environment during recording of the moving image file. The user input information can be used for retrieving the moving image file recorded on the recording medium. Thus, because of different purposes, the image quality adjustment data and the user input information are recorded as different additional information files. The control unit 103 controls, based on a user's setting result, whether to record the additional information files on the recording media 108 and 109.

FIG. 2A illustrates an example of the image quality adjustment data. The user can adjust, by operating the UI 104, the operation state of the imaging unit 101 concerning the setting items illustrated in FIG. 2A on a menu screen. In FIG. 2A, Gamma is a function that can change taste of the moving image by selecting one of several kinds of preset gamma curves. Setting values of the item Gamma include Normal for forming a standard image of a high-definition (HD) broadcast device, Cine Mode 1 capable of acquiring an image quality close to a film, and Cine Mode 2 for eventual file conversion. In FIG. 2A, the Cine Mode 1 is selected.

Black Master Pedestal is a function of adjusting a black level. When a setting value is large, a dark part of an image becomes bright to reduce overall contrast. When a setting value is small, luminance of the dark part is reduced. A highest setting value of this item is 50 while a lowest setting value is −50. In FIG. 2A, a value of 25 is set.

Low key Saturation is a function that can adjust a color of a low-luminance part thick or thin. In FIG. 2A, ON is selected to adjust a color thick as a setting value. Knee is a function that can suppress scattering by compressing a high-luminance part. In FIG. 2A, ON is selected to suppress scattering as a setting value. Sharpness is a function that can adjust a level of contour emphasis. A contour is emphasized more by selecting a high value. A highest setting value of this item is 50 while a lowest setting value is −50. In FIG. 2A, a value of 10 is set as a setting value. Setting items can be set for various other adjustments.

The user adjusts values of these various items by operating the menu screen in a photographing pause state. The control unit 103 controls the signal processing circuit of the imaging unit 101 based on the set values to change processing of the photographed moving image data. The control unit 103 stores the setting values of the items en bloc in the memory 106. The user can optionally set whether to adjust image quality based on the set values by using the menu screen.

Figure 3A:
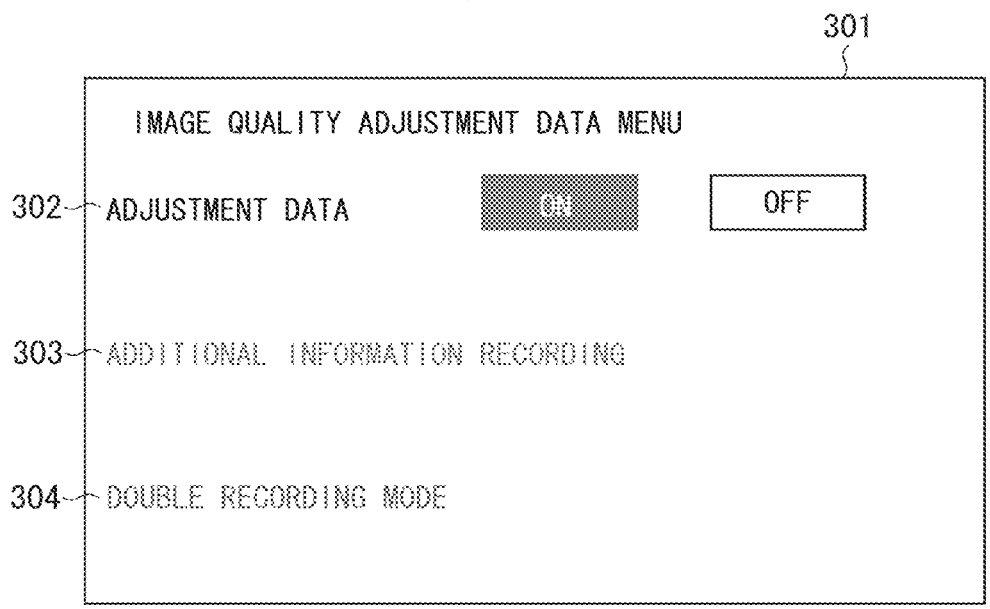
FIGS. 3A and 3B illustrate menu screens for setting image quality adjustment data.

FIG. 3A illustrates a menu screen for image quality adjustment setting. When the user instructs displaying of an image quality adjustment menu by operating the UI 104, the display control unit 111 displays a menu screen 301 illustrated in FIG. 3A on the display unit 112. On the menu screen 301, an item 302 is displayed to select whether to adjust image quality based on the set values illustrated in FIG. 2A. The user selects, by operating the UI 104, an ON button when the image quality is adjusted, and an OFF button when the image quality is not adjusted. In the present exemplary embodiment, the user selects the OFF button because an initial setting state is OFF. On the menu screen 301, an item 303 is displayed to select whether to record image quality adjustment data, and an item 304 is displayed to select a recording medium for recording the image quality adjustment data in the double recording mode. Both items are grayed out to be displayed, and consequently made invalid.

Figure 3B:
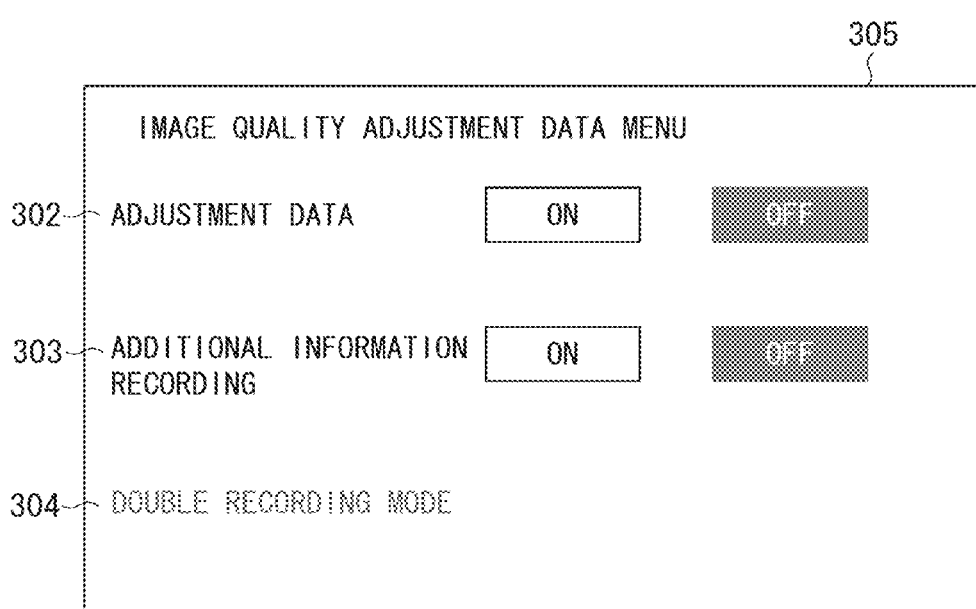

When the ON button is selected in the adjustment item 302, the display control unit 111 switches a screen to be displayed on the display unit 112 to a menu screen 305 illustrated in FIG. 3B. On the menu screen 305, the item 303 becomes valid. The user selects an ON button when the image quality adjustment data is recorded on the recording medium, and OFF button when not recorded. Assuming that the single recording mode has been set, the item 304 is made invalid. In FIG. 3B, the ON buttons are selected for the adjustment items 302 and 303. In this case, the moving image data photographed by the imaging unit 101 is processed based on the image quality adjustment setting value set by the user, and the image quality adjustment data set by the user is recorded together with the moving image data.

Figure 5A:
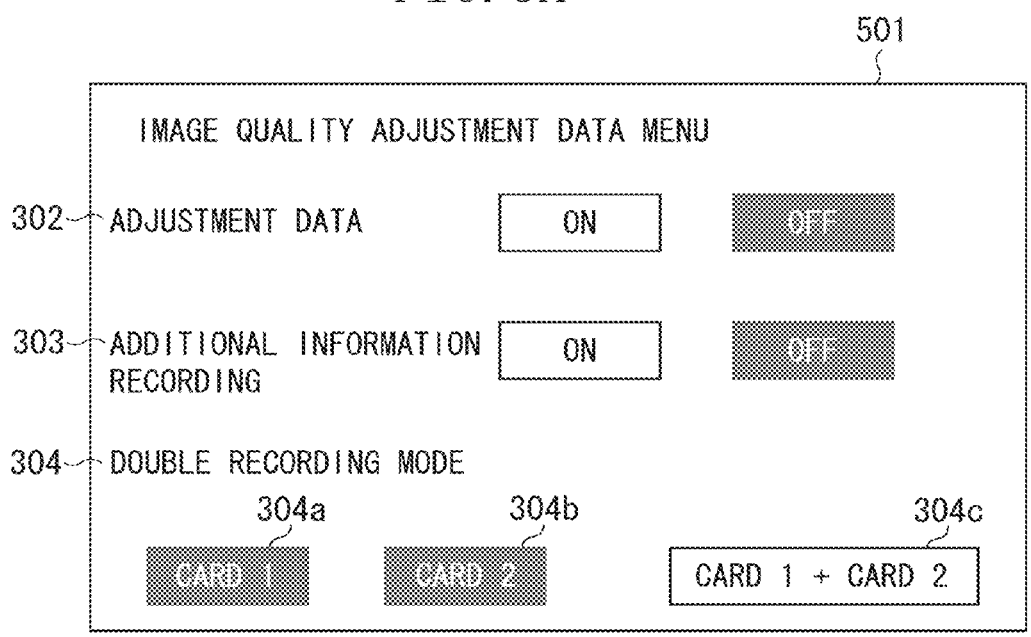
FIGS. 5A and 5B illustrate menu screens for setting image quality adjustment data and user input information.

When the user sets recording of the image quality data on the menu screen 305 illustrated in FIG. 3B in a selected state of the double recording mode, the display control unit 111 switches a screen to be displayed on the display unit 112 to a menu screen 501 illustrated in FIG. 5A. On the menu screen 501, an item 304 is valid. On the menu screen 501, a button 304a for selecting a card 1 (recording medium 108) as a recording destination, a button 304b for selecting a card 2 (recording medium 109) as a recording destination, and a button 304c for selecting both of the card 1 and the card 2 as recording destinations are displayed. The user can select a recording destination of the image quality adjustment data in the double recording mode by selecting one of the buttons 304a to 304c. In FIG. 5A, the card 1 and the card 2 are both selected as recording destinations.

In the present exemplary embodiment, the control unit 103 stores ON or OFF setting of the image quality adjustment in the single recording mode, ON or OFF setting of recording of the image quality adjustment data, and information of the recording destination in the memory 106. The control unit 103 stores ON or OFF setting of the image quality adjustment in the double recording mode, ON or OFF setting of recording of the image quality adjustment data, and information of the recording destination in the memory 106 independently of the single recording mode.

FIG. 2B illustrates an example of the user input information. In FIG. 2B, values of items including a location, a photographer, and a title are set by the user by operating the UI 104. For a date, the control unit 103 acquires information on current date and time counted by a timer (not illustrated) to automatically set its value. A global positioning system (GPS) item is for setting whether to add information on current latitude and longitude (GPS information) acquired by a GPS unit (not illustrated) using a well-known method to the moving image data. The user operates the UI 104 to set ON when the GPS information is added, and OFF when not added. The control unit 103 stores setting values of the items en block in the memory 106.

Figure 4:
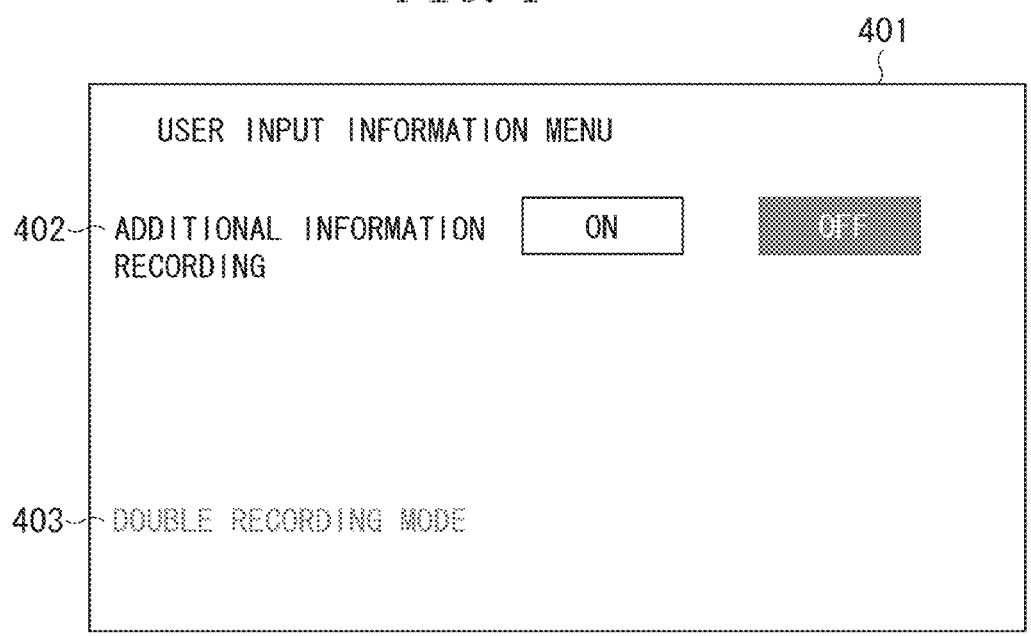
FIG. 4 illustrates a menu screen for setting user input information.

The user can optionally set whether to record the user input information by using the menu screen. FIG. 4 illustrates the menu screen for user input information setting. When the user instructs displaying of a user input information setting menu by operating the UI 104, the display control unit 111 displays a menu screen 401 illustrated in FIG. 4 on the display unit 112. On the menu screen 401, an item 402 is displayed to select whether to record the user input information set as illustrated in FIG. 2B. The user selects, by operating the UI 104, an ON button when the user input information is recorded on the recording medium, and an OFF button when not recorded.

In FIG. 4, because of selection of the ON button, the user input information illustrated in FIG. 2B is recorded together with the moving image data. On the menu screen 401, an item 403 is displayed to select a recording medium for recording the user input information in the double recording mode. In this case, however, assuming that the single recording mode has been set, the item 403 is made invalid.

Figure 5B:
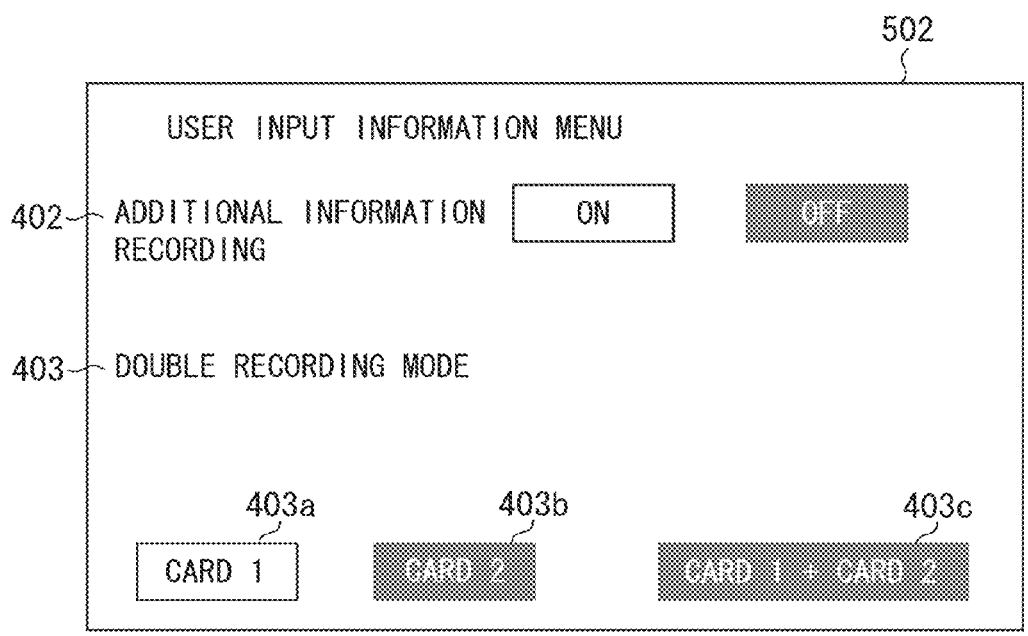

When the user sets recording of the user input information on the menu screen 401 illustrated in FIG. 4 in a selected state of the double recording mode, the display control unit 111 switches a screen to be displayed on the display unit 112 to a menu screen 502 illustrated in FIG. 5B. On the menu screen 502, the item 403 is valid. On the menu screen 502, a button 403*a* for selecting the card 1 as a recording destination, a button 403*b* for selecting the card 2 as a recording destination, and a button 403*c* for selecting both of the card 1 and the card 2 as recording destinations are displayed. The user can select a recording destination of the user input information in the double recording mode by selecting one of the buttons 403*a* to 403*c*. In FIG. 5B, the card 1 is selected as a recording destination.

In the present exemplary embodiment, the control unit 103 stores ON or OFF setting of recording of the user input information in the single recording mode, and information of the recording destination in the memory 106. The control unit 103 stores ON or OFF setting of recording of the user input information in the double recording mode, and information of the recording destination in the memory 106 independently of the single recording mode.

Next, a recording operation according to the present exemplary embodiment is described. First, processing in the single recording mode is described. FIG. 6 is a flowchart illustrating processing of the recording apparatus 100 in the single recording mode. The control unit 103 achieves the processing illustrated in FIG. 6 by controlling each unit.

When power is turned ON for the recording apparatus 100, the control unit 103 displays an image of an object based on moving image data photographed by the imaging unit 101 on the display unit 112 to set a recording pause state. In step S601, as described above, the control unit 103 determines whether image quality adjusting setting is ON. When the image quality adjustment setting is ON (YES in step S601), then in step S602, the control unit 103 controls the imaging unit 101 based on a setting value set by the user. When the image quality setting is OFF (NO in step S601), then in step S611, the control unit 103 controls the imaging unit 101 based on a predetermined value.

In step S603, an instruction is received from the UI 104 to start recording (YES). The processing then proceeds to step S604. The signal processing unit 105 reads the photographed moving image data and acquired audio data from the memory 106 to start coding. The signal processing unit 105 stores the coded data in the memory 106. The recording/reproducing unit 107 reads the coded moving image and the coded audio data from the memory 106, and records them as moving image files on one of the recording media 108 and 109 selected as a recording destination. When there is no instruction of a recording start (NO in step S603), the processing returns to step S601.

When an instruction is received from the UI 104 to stop recording during recording (YES in step S605), then in step S606, the control unit 103 stops the coding of the moving image and the audio data executed by the signal processing unit 105 to close the files being recorded by the recording/reproducing unit 107. The control unit 103 then instructs the recording/reproducing unit 107 to change a recording order based on management information (control information) so as to reproduce a plurality of moving image files recorded on the recording medium in a recording order, and record the files on the recording medium. In the present exemplary embodiment, a series of moving images and sounds recorded from the instruction of stopping the recording to the instruction of ending the recording are managed as one file. When there is no instruction of stopping the recording (NO in step S605), the processing returns to step S604.

In step S607, the control unit 103 checks a recording setting state of image quality adjustment data in the single recording mode. When recording of the image quality adjustment data is ON, the processing proceeds to step S608. The control unit 103 controls the recording/reproducing unit 107 to read the image quality adjustment data from the memory 106, and record the data as one file (first additional information file). When recording of the image quality adjustment data is OFF, the processing proceeds to step S609. The control unit 103 inhibits recording of the image quality adjustment data. Then, the control unit 103 checks a recording setting state of user input information in the single recording mode.

When recording of the user input information is ON, then in step S610, the control unit 103 controls the recording/reproducing unit 107 to read the user input information from the memory 106, and record the data as one file (second additional information file). When recording of the user input information is OFF, the control unit 103 inhibits recording of the user input information. Thus, the moving image file and the additional information file are recorded on one of the two recording media 108 and 109.

Recording forms of a moving image file, an image quality adjustment data file, and a user input information file are described below. In the present exemplary embodiment, each file is stored in a folder to be managed. In the present exemplary embodiment, one folder is generated for each scene. One folder stores a moving image file of one scene, an image quality adjustment data file regarding the moving image file, and a user input information file. Storing the moving image file, the image quality adjustment data file regarding the moving image file, and the user input information file in one folder facilitates detection of image quality adjustment data regarding the moving image file and user input information.

In addition, information for identifying whether the image quality adjustment data file regarding the moving image file, and the user input information file have been recorded, and information on the image quality adjustment data file and the user input information file can be recorded.

Figure 7A:
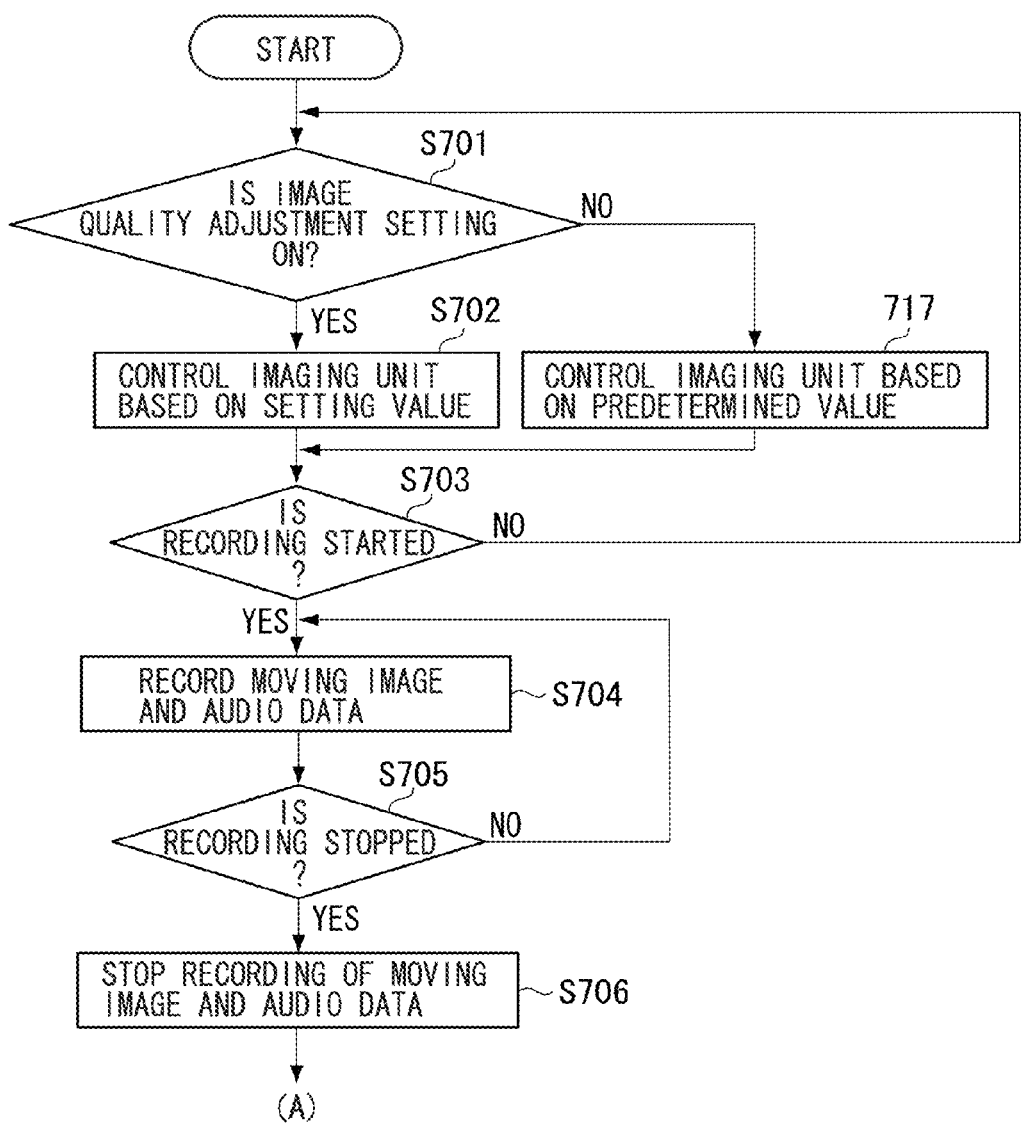
FIGS. 7A and 7B are flowcharts illustrating processing in a double recording mode.
Figure 7B:
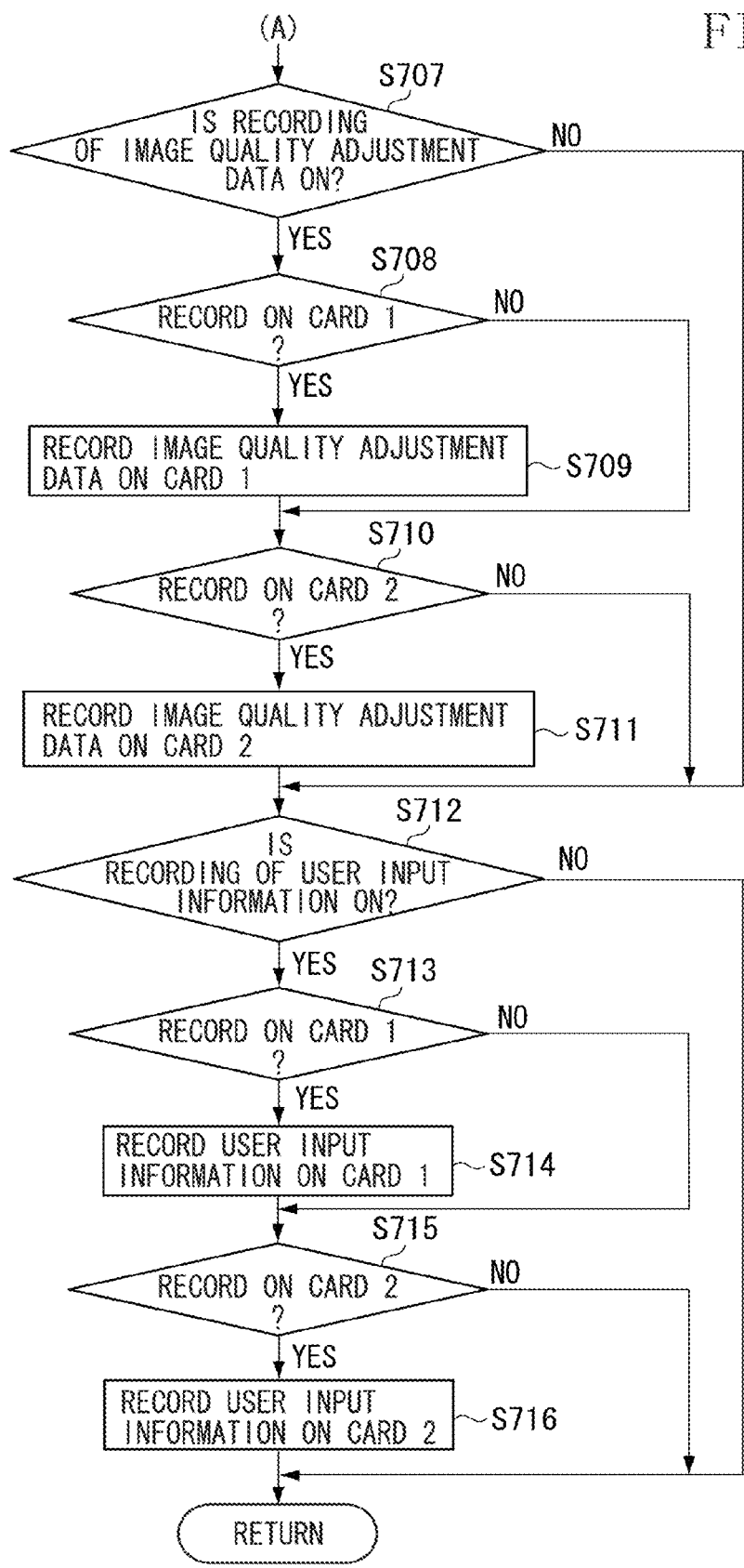

Next, processing in the double recording mode is described. FIGS. 7A and 7B are flowcharts illustrating processing in the double recording mode. The control unit 103 achieves the processing illustrated in FIGS. 7A and 7B by controlling each unit. In step S701, in the recording pause state, as described above, the control unit 103 determines whether image quality adjusting setting is ON. When the image quality adjustment setting is ON, the processing proceeds to step S702, and the control unit 103 controls the imaging unit 101 based on a setting value set by the user. When the image quality setting is OFF, the processing proceeds to step S717, and the control unit 103 controls the imaging unit 101 based on a predetermined value.

In step S703, an instruction is received from the UI 104 to start recording (YES). The processing then proceeds to step S704. The signal processing unit 105 reads the photographed moving image data and the acquired audio data from the memory 106 to start coding. The signal processing unit 105 stores the coded data in the memory 106. The recording/reproducing unit 107 reads the coded moving image and the coded audio data from the memory 106, and records them as moving image files on the recording medium 108 and the recording medium 109. When there is no instruction of a recording start (NO in step S703), the processing returns to step S701.

When an instruction is received from the UI 104 to stop recording (YES in step S705), the processing proceeds to step S706, and the control unit 103 stops the coding of the moving image and the audio data executed by the signal processing unit 105 to close the files being recorded on each recording medium by the recording/reproducing unit 107. The control unit 103 then instructs the recording/reproducing unit 107 to change a recording order based on management information (control information) so as to reproduce moving image files recorded on each recording medium in a recording order, and record the files on each recording medium. When there is no instruction of stopping the recording (NO in step S705), the processing returns to step S704.

In step S707, the control unit 103 checks a recording setting state of image quality adjustment data in the double recording mode. When recording of the image quality adjustment data is OFF (NO in step S707), the processing proceeds to step S712. When recording of the image quality adjustment data is ON, then in step S708, the control unit 103 determines whether the card 1 (recording medium 108) has been set as a recording destination. When the card 1 has been set as the recording destination (YES in step S708), then in step S709, the control unit 103 controls the recording/reproducing unit 107 to read the image quality adjustment data from the memory 106, and record the data as one file on the recording medium 108.

In step S710, the control unit 103 determines whether the card 2 (recording medium 109) has been set as a recording medium. When the card 2 has been set as the recording destination (YES in step S710), then in step S711, the control unit 103 controls the recording/reproducing unit 107 to read the image quality adjustment data from the memory 106, and record the data as one file on the recording medium 109. Thus, an additional information file of the image quality adjustment data is recorded on one of the cards 1 and 2 set as the recording destination.

In step S712, the control unit 103 checks a recording setting state of user input information in the double recording mode. When recording of the user input information is ON, then in step S713, the control unit 103 determines whether the card 1 has been set as a recording destination. When the card 1 has been set as the recording destination (YES in step S713), then in step S714, the control unit 103 controls the recording/reproducing unit 107 to read the user input information from the memory 106, and record the data as one file on the recording medium 108.

In step S715, the control unit 103 determines whether the card 2 has been set as a recording medium. When the card 2 has been set as the recording destination (YES in step S715), then in step S716, the control unit 103 controls the recording/reproducing unit 107 to read the user input information from the memory 106, and record the data as one file on the recording medium 109. Thus, an additional information file of the user input information is recorded on one of the cards 1 and 2 set as the recording destination.

Next, displaying during switching between the single recording mode and the double recording mode is described. In the present exemplary embodiment, the mode is switched between the single recording mode and the double recording mode by using the menu screen. When the mode is switched between the single recording mode and the double recording mode, a recoding setting state of the image quality adjustment data and the user input information in the switched mode is displayed.

Figure 8A:
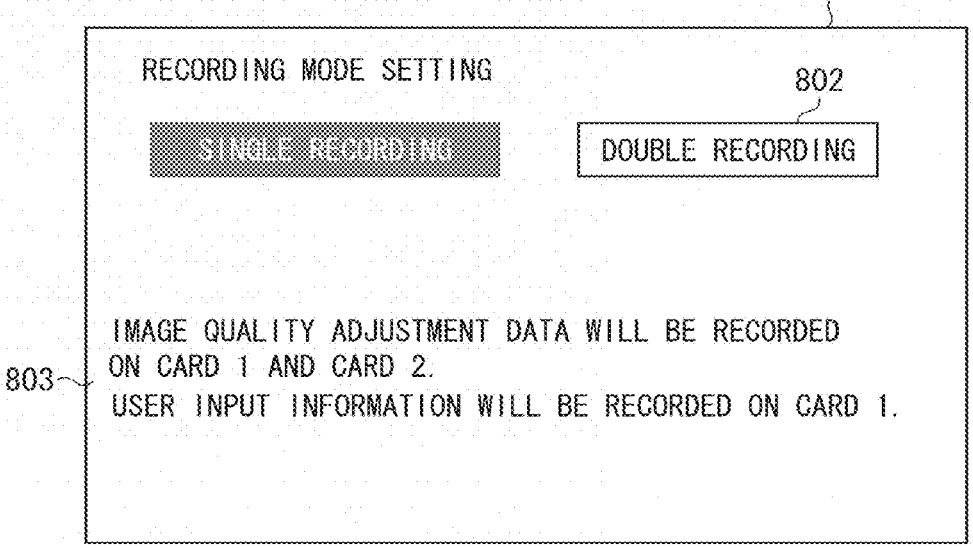
FIGS. 8A and 8B illustrate menu screens for recording mode setting.

For example, when the mode is switched from the single recording mode to the double recording mode, according to a switching instruction, the recording setting state of the image quality adjustment data and the user input information in the double recording mode is automatically displayed on the display unit 112. For example, the user instructs switching from the single recording mode to the double recording mode by selecting a double recording button 802 on a menu screen 801 illustrated in FIG. 8A. In this case, when recording of the image quality adjustment data is set as illustrated in FIG. 5A, and recording of the user input information is set as illustrated in FIG. 5B, information 803 illustrated in FIG. 8A is displayed. In other words, the control unit 103 displays the information 803 indicating that the image quality adjustment data will be recorded on the cards 1 and 2 and that the user input information will be recorded on the card 1 on the display unit 112.

Figure 8B:
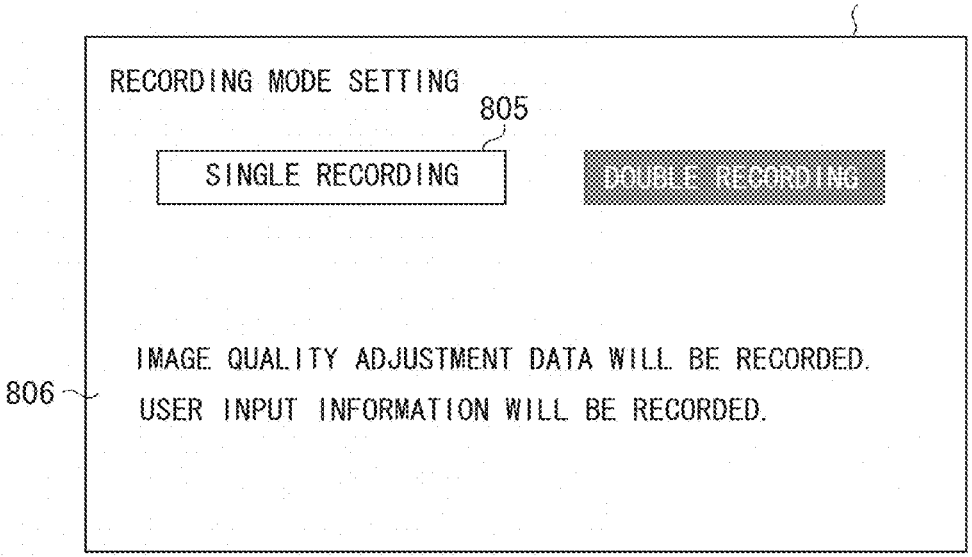

The user switches the mode from the double recording mode to the single recording mode by selecting a single recording button 805 on a menu screen 804 illustrated in FIG. 8B. In this case, when recording of the image quality adjustment data is set as illustrated in FIG. 3B, and recording of the user input information is set as illustrated in FIG. 4, the control unit 103 displays information 806 indicating that the image quality adjustment data and the user input information will be recorded on the display unit 112.

Next, processing during reproduction is described. When switching of a reproduction mode is instructed from the UI 104, the control unit 103 detects, for the recording/reproducing unit 107, a plurality of scenes recorded on a selected one of the recording media 108 and 109. A head moving image file of each scene is reproduced, and one screen of the head is decoded by the signal processing unit 105 to be stored in the memory 106. The signal processing unit 105 compresses an image signal of the decoded head screen to generate a representative image of each screen. An index screen including representative images of the plurality of scenes is generated to be displayed on the display unit 112.

The user operates the UI 104 to select a desired representative image from the representative images displayed on the index screen, and instructs reproduction. The control unit 103, which has received the reproduction instruction, controls the recording/reproducing unit 107 to reproduce a plurality of moving image files of the scene corresponding to the selected representative image. The recording/reproducing unit 107 reproduces the moving image files of the designated scene from the recording medium. The signal processing unit 105 decodes the reproduced moving image files to display them on the display unit 112, and outputs the files to the outside by the output unit 110.

According to the present exemplary embodiment, in the double recording mode, whether to record an additional information file such as the image quality adjustment data or the user input information on each of the two recording media is optionally set. Thus, when the moving image files are simultaneously recorded on the two recording media, the user can set non-recording of any additional information file on one of the recording media. As a result, there is no need to delete any additional information file after the simultaneous recording.

Recording of the additional information file in the double recording mode can be set independently of recording setting of the additional information file in the single recording mode. Hence, the user does not need to execute resetting each time the recoding mode is switched. When the mode is switched between the single recording mode and the double recording mode, the recording setting state of the additional information in the switched recording mode is automatically displayed. Hence, the user can easily check the setting state in the switched recording mode.

According to the present exemplary embodiment, the moving images and the sounds are recorded on the two recording media. However, the moving images and the sounds can be recorded on three or more recording media. The present invention can similarly be applied to an apparatus that records moving images on a plurality of recording media. According to the present exemplary embodiment, the additional information file is recorded after the recording of the moving image file has been stopped. However, after a recording start has been instructed, the additional information file can be recorded before the moving image file is recorded.

Next, a second exemplary embodiment of the present invention is described. The present exemplary embodiment is similar to the first exemplary embodiment in configuration of a recording apparatus 100, and basic recording and reproducing processes. In the present exemplary embodiment, a setting state is not displayed each time a recording mode is switched. However, when a setting state in at least one recording medium in a double recording mode and a setting state in a single recording mode are different from each other, a setting state in a switched mode is displayed.

Figure 9A:
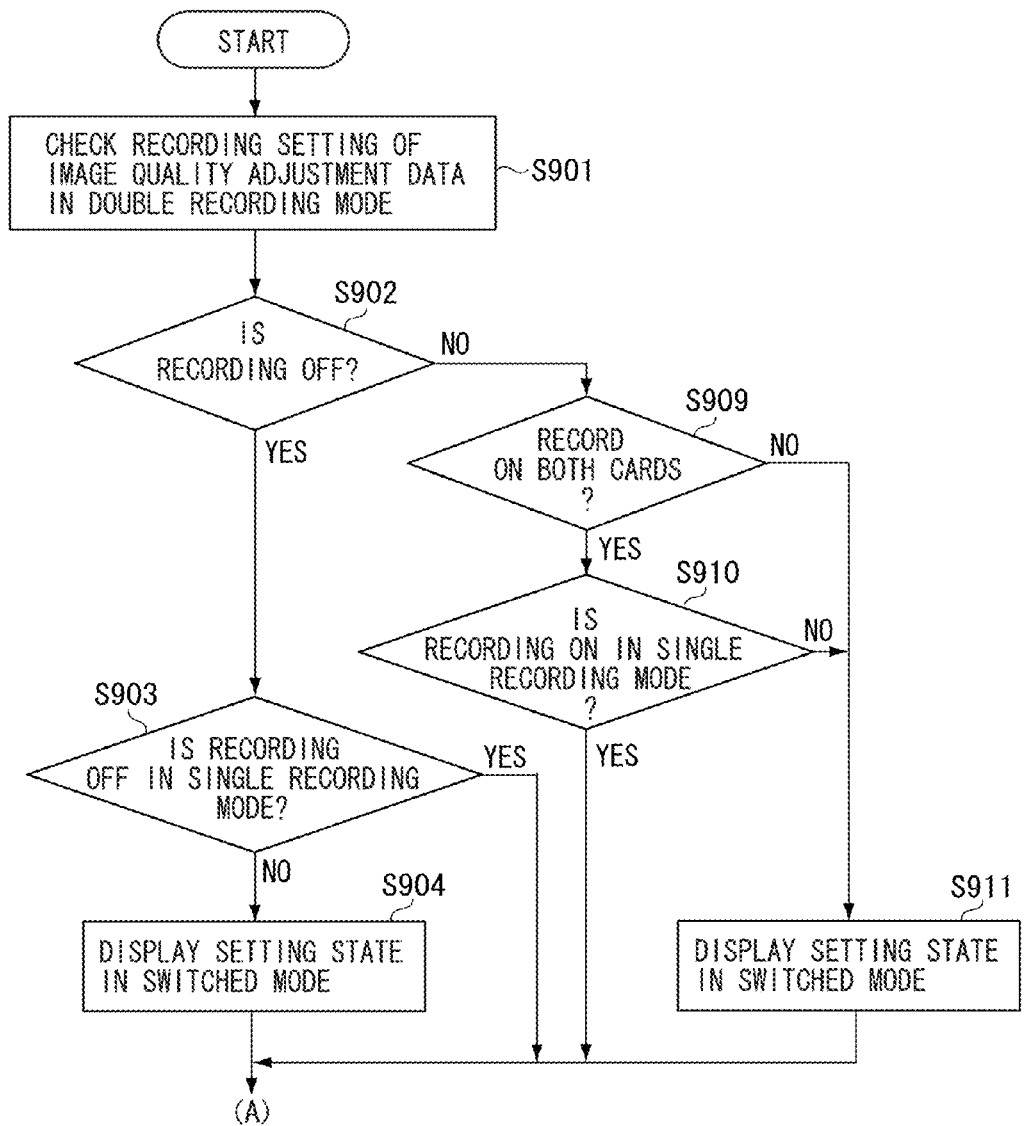
FIGS. 9A and 9B are flowcharts illustrating processing at the time of recording mode switching according to a second exemplary embodiment of the present invention.
Figure 9B:
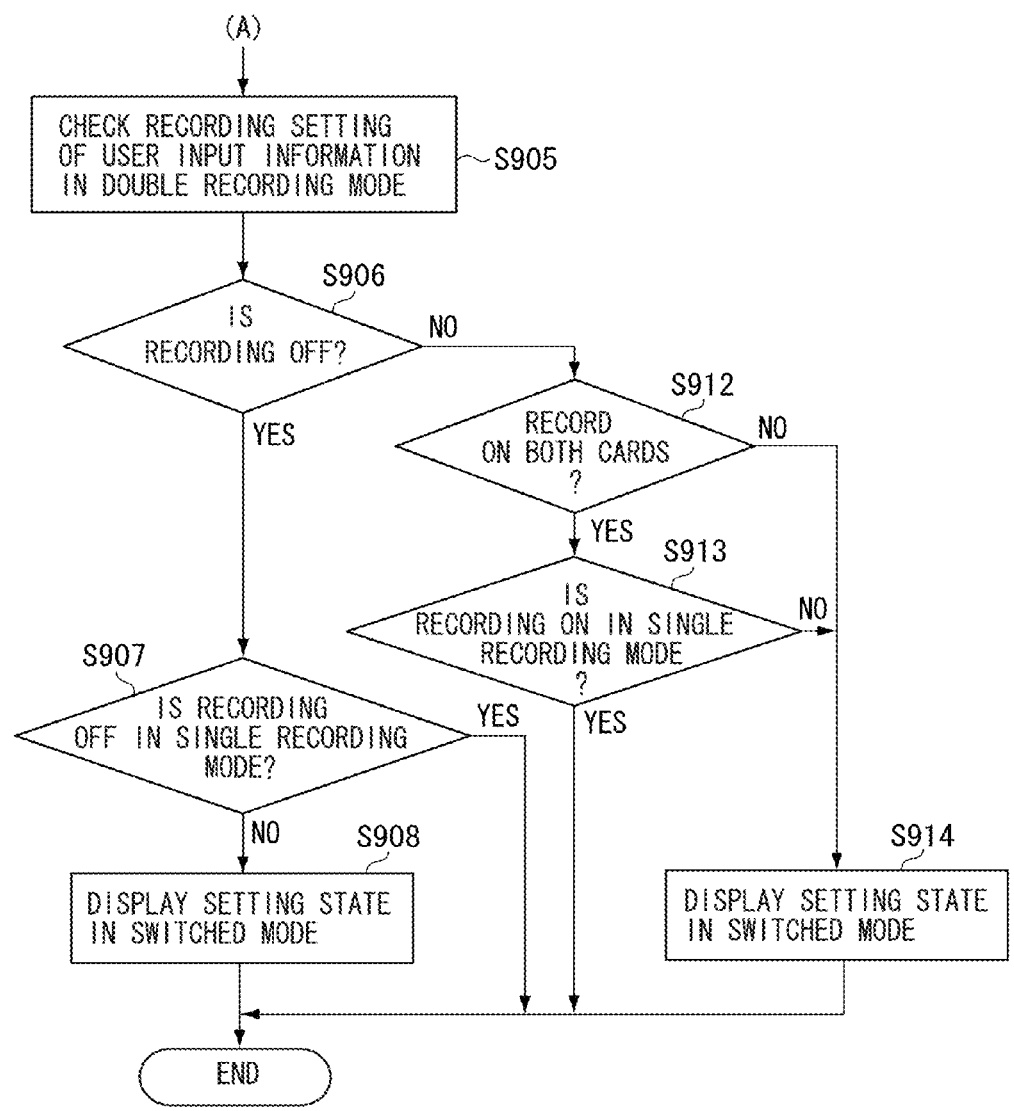

FIG. 9 is a flowchart illustrating display processing of a setting state during recording mode switching. A control unit 103 achieves the processing illustrated in FIG. 9 by controlling each unit.

A user operates a UI 104 to instruct recording mode switching in a state where a recording mode switching menu screen is displayed on a display unit 112. In step S901, the control unit 103 checks recording setting of image quality adjustment data in the double recording mode.

In step S902, the control unit 103 determines whether recording of the image quality adjustment data in the double recording mode is OFF. When the recording of the image quality adjustment data in the double recording mode is OFF (YES in step S902), then in step S903, the control unit 103 determines whether recording of the image quality adjustment data in the single recording mode is OFF. When the recording of the image quality adjustment data in the single recording mode is not OFF (NO in step S903), then in step S904, the control unit 103 displays a recording setting state of the image quality adjustment data in the switched mode on the display unit 112. When the recording of the image quality adjustment data in the single recording mode is OFF (YES in step S903), the processing proceeds to step S905 without displaying the recording setting state of the image quality adjustment data in the switched mode.

When the recording of the image quality adjustment data in the double recording mode is not OFF (NO in step S902), the processing proceeds to step S909. The control unit 103 determines whether recording of the image quality adjustment data on both of a card 1 and a card 2 in the double recording mode has been set. When the recording of the image quality adjustment data on both of the card 1 and the card 2 in the double recording mode has been set (YES in step S909), then in step S910, the control unit 103 determines whether recording of the image quality adjustment data in the single recording mode is ON. When the recording of the image quality adjustment data in the single recording mode is OFF (NO in step S910), then in step S911, the control unit 103 displays the recording setting state of the image quality adjustment data in the switched mode on the display unit 112. When the recording of the image quality adjustment data in the single recording mode is ON (YES in step S910), the processing proceeds to step S909.

When setting of recording of the image quality adjustment data on one of the card 1 and the card 2 in the double recording mode is determined in step S909, then in step S911, the control unit 103 displays the recording setting state of the image quality adjustment data in the switched mode on the display unit 112.

In step S905, the control unit 103 checks recording setting of user input information in the double recording mode. In step S906, the control unit 103 determines whether recording of the user input information in the double recording mode is OFF. When the recording of the user input information in the double recording mode is OFF (YES in step S906), then in step S907, the control unit 103 determines whether recording of the user input information data in the single recording mode is OFF. When the recording of the user input information in the single recording mode is not OFF (NO in step S907), then in step S908, the control unit 103 displays a recording setting state of the user input information in the switched mode on the display unit 112. When the recording of the user input information in the single recording mode is OFF (YES in step S907), the control unit 103 ends the processing without displaying the recording setting state of the user input information in the switched mode.

When the recording of the user input information in the double recording mode is not OFF (NO in step S906), then in step S912, the control unit 103 determines whether recording of the user input information on both of the card 1 and the card 2 in the double recording mode has been set. When the recording of the user input information on both of the card 1 and the card 2 in the double recording mode has been set (YES in step S912), then in step S913, the control unit 103 determines whether recording of the user input information in the single recording mode is ON. When the recording of the user input information in the single recording mode is OFF (NO in step S913), then in step S914, the control unit 103 displays the recording setting state of the user input information in the switched mode on the display unit 112. When setting of recording of the user input information on one of the card 1 and the card 2 in the double recording mode is determined in step S912, then in step S914, the control unit 103 displays the recording setting state of the user input information in the switched mode on the display unit 112. When the recording of the user input information in the single recording mode is ON (YES in step S913), the control unit 103 stops displaying of the recording setting state of the user input information in the switched mode.

Thus, according to the present exemplary embodiment, when a setting state in at least one of the recording media in the double recording mode and a setting state in the single recording mode are different from each other, the setting state in the switched mode is displayed, and hence no bothersome operation is necessary.

Next, a third exemplary embodiment of the present invention is described. The present exemplary embodiment is similar to the first exemplary embodiment in configuration of a recording apparatus 100, and basic recording and reproducing processes. According to the present exemplary embodiment, when a mode is switched from a double recording mode to a single recording mode, a user determines a setting state in the single recording mode based on a setting state in the double recording mode. In other words, according to the present exemplary embodiment, when additional information is recorded on one recording medium while no additional information is recorded in the other recording medium in the double recording mode, non-recording of any additional information in the single recording mode is automatically set.

Figure 10:
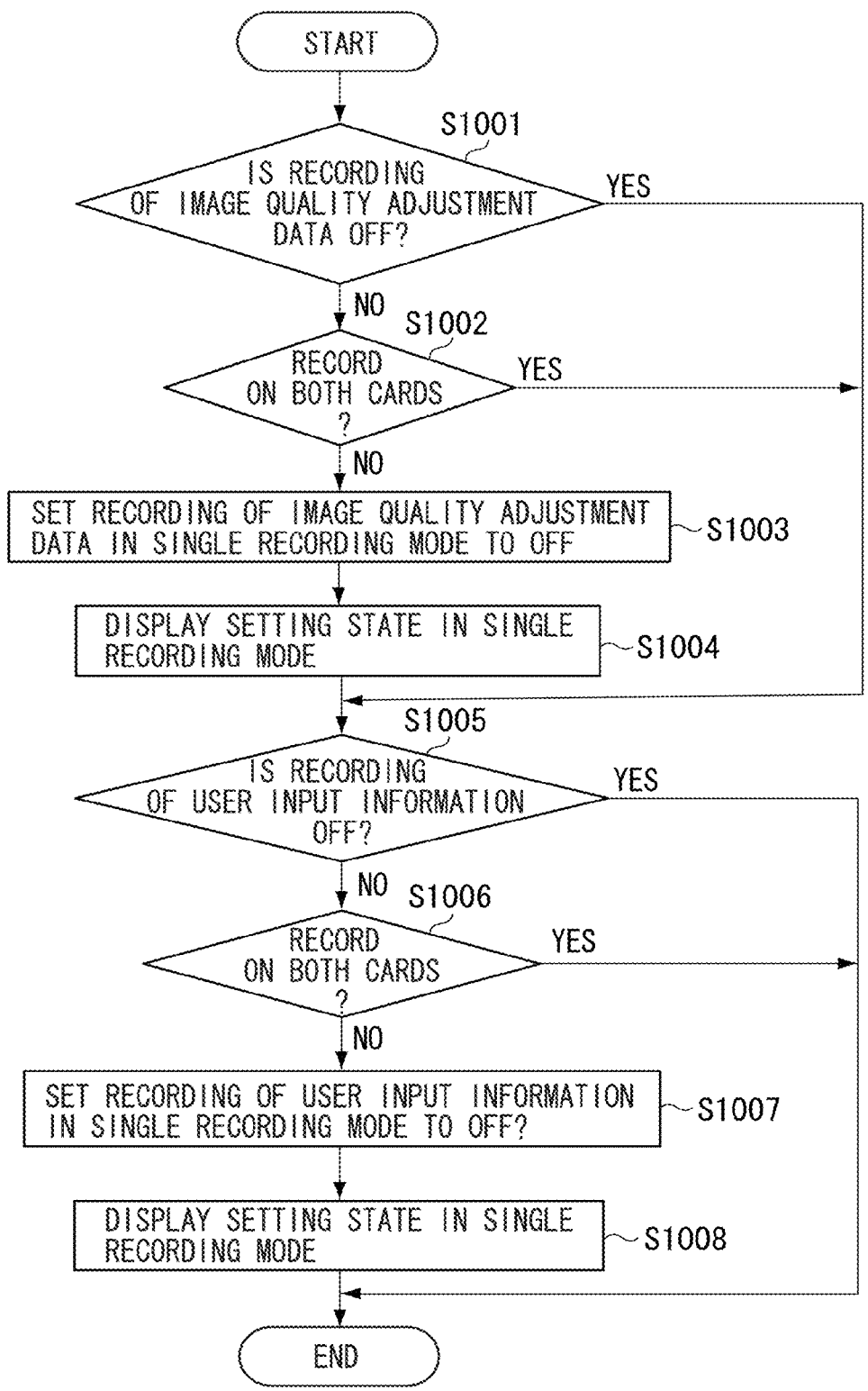
FIG. 10 is a flowchart illustrating processing when a mode has been switched to a single recording mode according to a third exemplary embodiment of the present invention.

FIG. 10 is a flowchart illustrating a recording setting operation of additional information when the mode is switched from the double recording mode to the single recording mode. Each step illustrated in FIG. 10 is executed under control of a control unit 103.

When a menu screen is displayed on a display unit 112 by a user's instruction, and switching from the double recording mode to the single recording mode is instructed, then in step S1001, the control unit 103 determines whether recording of image quality adjustment data is OFF in the double recording mode. When the recording of the image quality adjustment data is not OFF (NO in step S1001), then in step S1002, the control unit 103 determines whether recording of the image quality adjustment data on both memory cards has been set. When the recording of the image quality adjustment data on both of the cards has not been set (NO in step S1002), recording of the image quality adjustment data on one of the cards has been set. Thus, in step S1003, the control unit 103 automatically sets recording of the image quality adjustment data in the single recording mode to OFF.

According to the present exemplary embodiment, the user can set the recording state of the image quality adjustment data in the single recording mode. In this case, however, irrespective of a user's setting result, the recording of the image quality adjustment data is forcibly turned OFF. In step S1004, the control unit 103 displays information indicating that the recording setting state of the image quality adjustment data is OFF in the single recording mode on a menu screen displayed on the display unit 112. The processing then proceeds to step S1005. The processing also proceeds to step S1005 when the recording of the image quality adjustment data is OFF ((YES in step S1001), and when the recording of the image quality adjustment data on both of the cards has been set (YES in step S1002), the processing proceeds to step S1005. In this case, based on the user's setting result, a recording state of the image quality adjustment data in the single recording mode is set.

In step S1005, the control unit 103 determines whether recording of user input information is OFF in the double recording mode. When the recording of the user input information is not OFF (NO in step S1005), then in step S1006, the control unit 103 determines whether recording of the user input information on both memory cards has been set. When the recording of the user input information on both of the cards has not been set (NO in step S1006), recording of the user input information on one of the cards has been set. Thus, in step S1007, the control unit 103 automatically sets recording of the user input information in the single recording mode to OFF.

According to the present exemplary embodiment, the user can set the recording state of the user input information in the single recording mode. In this case, however, irrespective of a user's setting result, the recording of the user input information is forcibly turned OFF. In step S1008, the control unit 103 displays information indicating that the recording setting state of the user input information is OFF in the single recording mode on the menu screen displayed on the display unit 112. When the recording of the user input information is OFF ((YES in step S1005), and when both of the cards are recoding destinations (YES in step S1006), the processing ends. In this case, based on the user's setting result, a recording state of the user input information in the single recording mode is set.

Figure 12A:
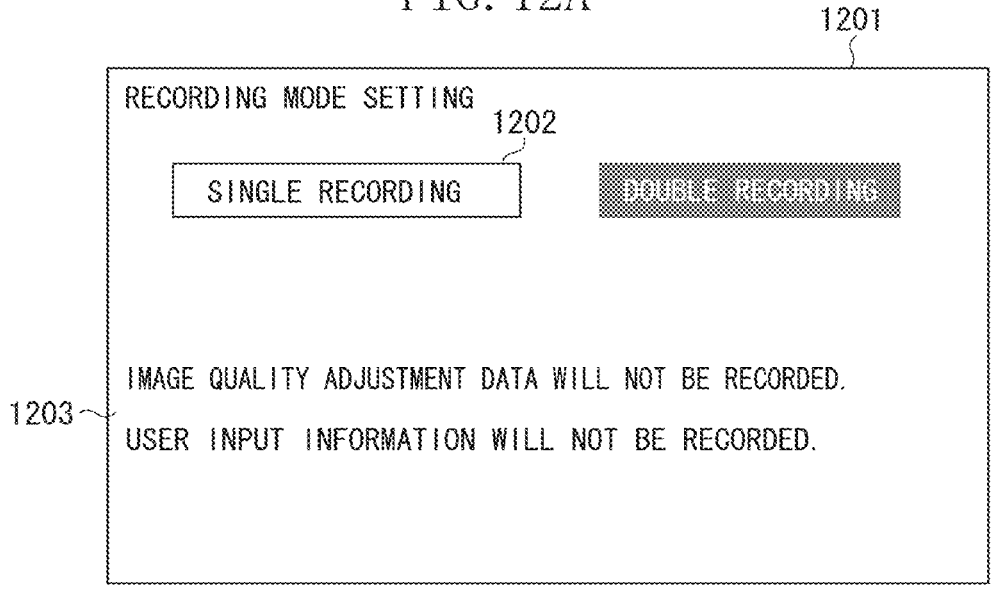
FIGS. 12A and 12B illustrate display screens when the mode has been switched to the single recording mode.

For example, in the case of setting that the image quality adjustment data and the user input information are recorded on the card 1 while neither is recorded on the card 2 in the double recording mode, a menu screen 1201 illustrated in FIG. 12A is displayed when the mode is switched from the double recording mode to the single recording mode. When the user selects a button 1202 on the menu screen 1201 to instruct switching to the single recording mode, information 1203 indicating setting that neither the image quality adjustment data nor the user input information is recorded is displayed.

When wishing to change the recording setting state of the image quality adjustment data and the user input information after the information 1203 has been checked, the user can change the setting as described above.

Thus, according to the present exemplary embodiment, when additional information is recorded on one recording medium while no additional information is set on the other recording medium in the double recording mode after the mode has been switched from the double recording mode to the single recording mode, non-recording of any additional information in the single recording mode is automatically set. As a result, unintentional recording of any additional information in the single recording mode by the user can be prevented.

Next, a fourth exemplary embodiment of the present invention is described. The present exemplary embodiment is similar to the first exemplary embodiment in configuration of a recording apparatus 100, and basic recording and reproducing processes. According to the present exemplary embodiment, after a user has switched a mode from a double recording mode to a single recording mode, when additional information is recorded on one recording medium while no additional information is recorded on the other recording medium in the double recording mode, an inquiry screen for recording setting of additional information is automatically displayed.

Figure 11:
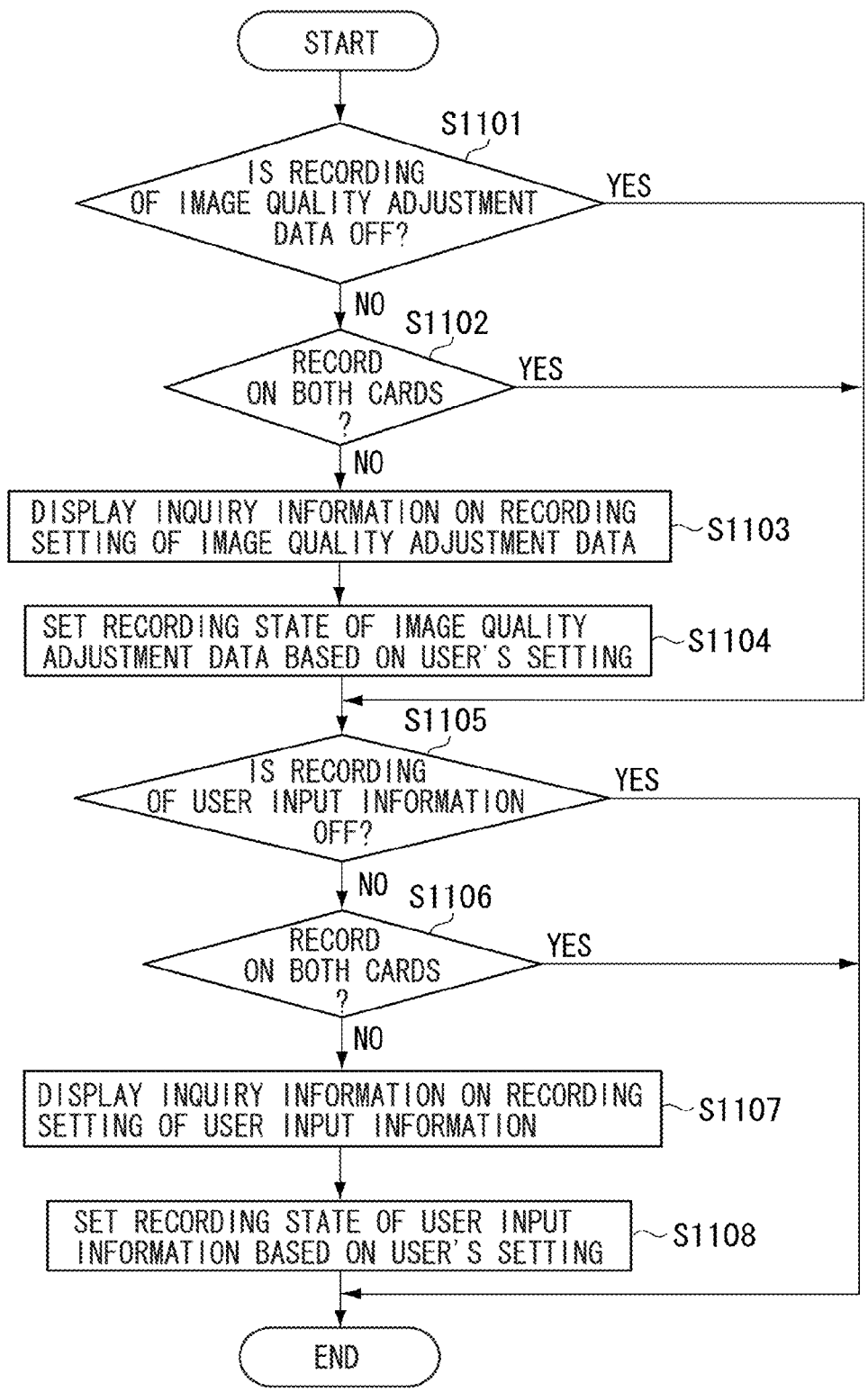
FIG. 11 is a flowchart illustrating processing when a mode has been switched to a single recording mode according to a fourth exemplary embodiment of the present invention.

FIG. 11 is a flowchart illustrating an operation when the mode is switched from the double recording mode to the single recording mode. Each step illustrated in FIG. 11 is executed under control of a control unit 103.

When a menu screen is displayed on a display unit 112 by a user's instruction, and switching from the double recording mode to the single recording mode is instructed, then in step S1101, the control unit 103 determines whether recording of image quality adjustment data is OFF in the double recording mode. When the recording of the image quality adjustment data is not OFF (NO in step S1101), then in step S1102, the control unit 103 determines whether recording of the image quality adjustment data on both memory cards has been set. When the recording of the image quality adjustment data on both of the cards has not been set (NO in step S1102), recording of the image quality adjustment data on one of the cards has been set. Thus, in step S1103, the control unit 103 displays inquiry information of recording setting of the image quality adjustment data in the single recording mode on the display unit 112. In step S1004, the control unit 103 sets, according to user's setting, a recording state of the image quality adjustment data in the single recording mode. When the recording of the image quality adjustment data is OFF ((YES in step S1101), and when both of the cards are recording destinations (YES in step S1102), the processing proceeds to step S1105. In this case, based on the user's preset result, a recording state of the image quality adjustment data in the single recording mode is set.

In step S1105, the control unit 103 determines whether recording of user input information is OFF in the double recording mode. When the recording of the user input information is not OFF (NO in step S1105), then in step S1106, the control unit 103 determines whether recording of the user input information on both memory cards has been set. When the recording of the user input information on both of the cards has not been set (NO in step S1106), recording of the user input information on one of the cards has been set. Thus, in step S1107, the control unit 103 displays inquiry information of recording setting of the user input information in the single recording mode. In step S1008, the control unit 103 sets, according to user's setting, a recording state of the user input information in the single recording mode. When the recording of the user input information is OFF ((YES in step S1105), and when both of the cards are recoding destinations (YES in step S1106), the processing ends. In this case, based on the user's preset result, a recording state of the user input information in the single recording mode is set.

Figure 12B:
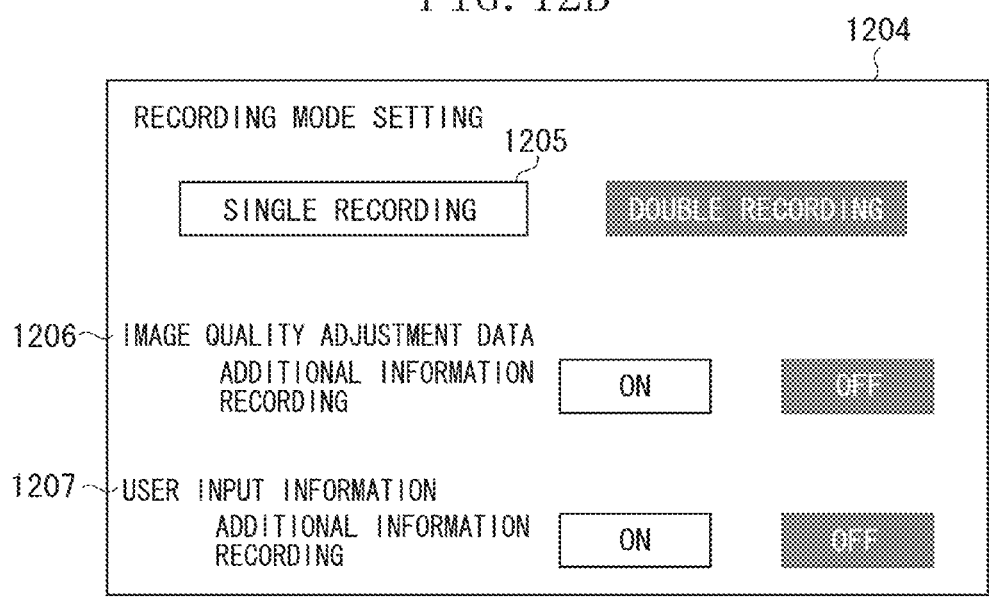

For example, in the case of setting that the image quality adjustment data and the user input information are recorded on the card 1 while neither is recorded on the card 2 in the double recording mode, a menu screen 1204 illustrated in FIG. 12B is displayed when the mode is switched from the double recording mode to the single recording mode. When the user selects a button 1205 on the menu screen 1204 to instruct switching to the single recording mode, information 1206 for making an inquiry about a recording setting state of the image quality adjustment data and information 1207 for making an inquiry about a recording setting state of the user input information are displayed.

The user checks the inquiry information 1206 and the inquiry information 1207, and can set whether to record the data by selecting an ON or OFF button. Information indicating a setting state of each additional information in the single recording mode is stored in the memory 106.

Thus, according to the present exemplary embodiment, when additional information is recorded on one recording medium while no additional information is set on the other recording medium in the double recording mode after the mode has been switched from the double recording mode to the single recording mode, the inquiry screen for the setting state of the additional information is automatically displayed. As a result, when pieces of additional information recorded on the two cards in the double recording mode are different from each other, the user can be prompted to set additional information again.

The present exemplary embodiment has been directed to an apparatus that records moving image data and audio data. However, the present invention can be similarly applied to an apparatus that records other input information data.

According to the exemplary embodiments, as the additional information, two types of information, namely, the image quality adjustment data and the user input information, are recorded as different files. However, one of the two types of information can be recorded, or other types of additional information can be recorded.

The present invention can be achieved by executing the following processing. Software (computer program) for achieving the functions of the exemplary embodiments is supplied to a system or an apparatus via a network or various computer-readable storage media. Then, a computer (or central processing unit (CPU) or micro processing unit (MPU)) of the system or the apparatus reads the program to execute it.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-187429 filed Aug. 24, 2010, which is hereby incorporated by reference herein in its entirety.

What is claimed is:

1. A recording apparatus comprising:
    an input unit configured to input moving image data;
    a recording unit configured to record at least one of a moving image file containing the moving image data input by the input unit and an additional information file containing additional information of the moving image data on at least one of a plurality of recording media;
    a mode setting unit configured to set one of a plurality of modes including a first recording mode in which the recording unit records the moving image file on a selected one of the plurality of recording media and a second recording mode in which the recording unit simultaneously records the moving image file on each of the plurality of recording media;
    a setting unit configured to, while in the second recording mode, set whether to record the additional information file on each of the plurality of recording media or on one of the plurality of recording media; and
    a control unit configured to control, based on a setting result by the setting unit, whether to record the additional information file on each of the plurality of recording media by the recording unit in the second recording mode.

2. The recording apparatus according to claim 1, wherein the plurality of recording media includes a first recoding medium and a second recording medium,
    wherein the control unit controls, when the setting unit sets recording of the additional information file on both of the first recording medium and the second recording medium, the recording unit to record the additional information file on both of the first recording medium and the second recording medium in the second recording mode,
    wherein the control unit controls, when the setting unit sets recording of the additional information file on the first recording medium while inhibiting recording of the additional information file on the second recording medium, the recording unit to record the additional information file on the first recording medium without recording the additional information file on the second recording medium in the second recording mode, and
    wherein the control unit controls, when the setting unit sets recording of the additional information file on the second recording medium without recording the additional information file on the first recording medium, the recording unit to record the additional information file on the second recording medium without recording the additional information file on the first recording medium in the second recording mode.

3. The recording apparatus according to claim 1, wherein the setting unit further sets whether to record the additional information file on the selected recording medium in the first recording mode, and
    wherein the control unit controls, based on the setting result by the setting unit, whether to record the additional information file on the selected recording medium in the first recording mode.

4. The recording apparatus according to claim 1, further comprising an output unit configured to output information to a display apparatus,
    wherein the control unit controls the output unit to output, according to switching of a recording mode between the first recording mode and the second recording mode by the mode setting unit, information regarding a setting state of whether to record the additional information in the switched recording mode to the display apparatus.

5. The recording apparatus according to claim 1, further comprising an output unit configured to output information to a display apparatus,
    wherein the control unit controls, according to switching from the second recording mode to the first recording mode by the mode setting unit, the output unit to output information indicating a setting state of whether to record the additional information in the switched recording mode to the display apparatus.

6. The recording apparatus according to claim 1, wherein the input unit includes an imaging unit configured to output the moving image data;

wherein the additional information includes first information regarding a setting state of the imaging unit and second information regarding an environment of the recording apparatus during recording of the moving image data, and wherein the recording unit records at least one of a first additional information file containing the first information and a second additional information file containing the second information on at least one of the plurality of recording media.

7. A method for recording image data, the method comprising:

inputting moving image data;

recording at least one of a moving image file containing the input moving image data and an additional information file containing additional information of the moving image data on at least one of a plurality of recording media;

setting one of a plurality of modes including a first recording mode for recording the moving image file on a selected one of the plurality of recording media and a second recording mode for simultaneously recording the moving image file on each of the plurality of recording media;

setting, while in the second recording mode, whether to record the additional information file on each of the plurality of recording media or on one of the plurality of recording media; and controlling, based on a setting result regarding recording of the additional information file, whether to record the additional information file on each of the plurality of recording media in the second recording mode.

* * * * *